United States Patent Office 3,287,565
Patented Nov. 22, 1966

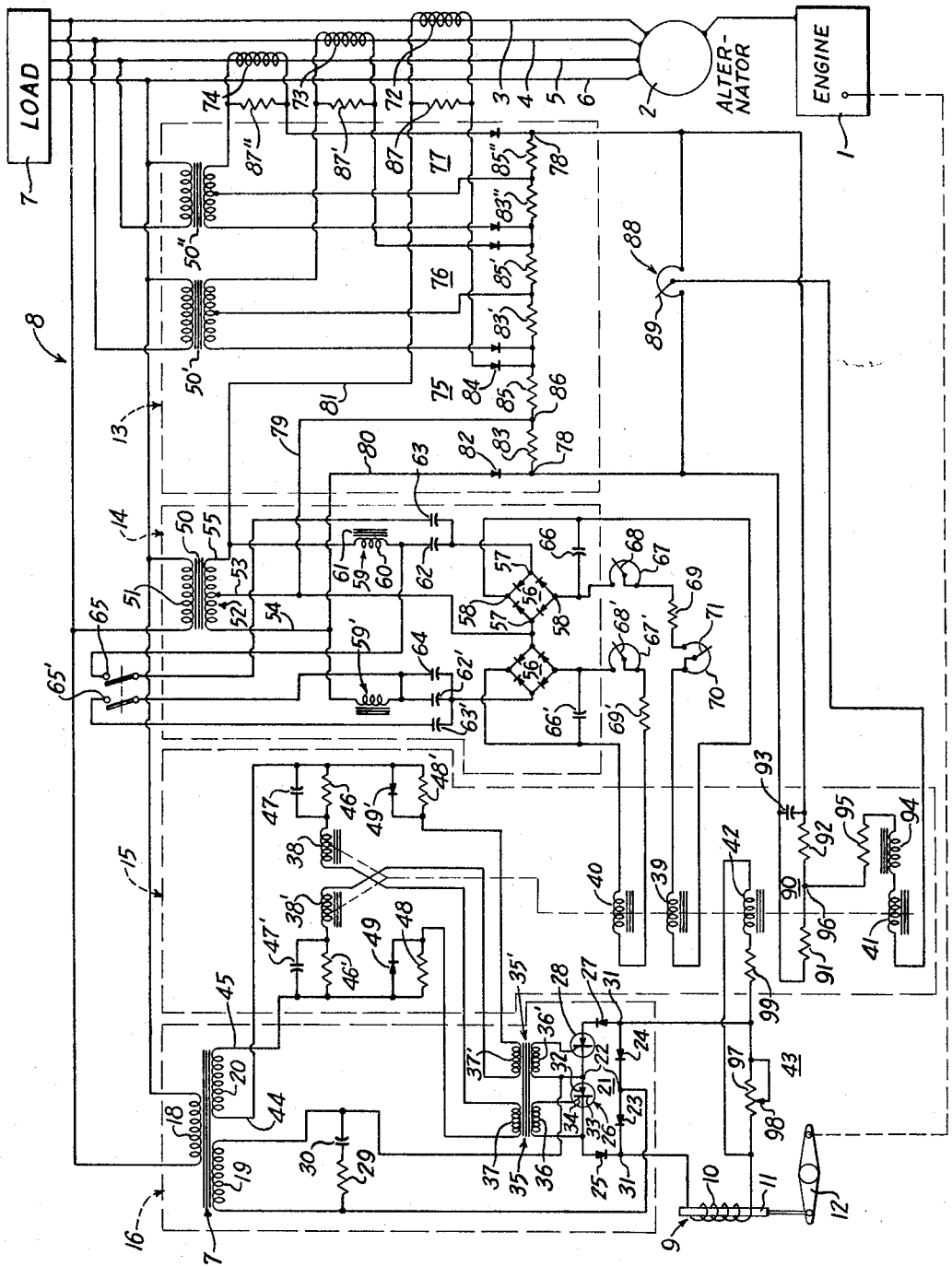

3,287,565
ELECTRICAL RESPONSIVE CONTROLS FOR PRIME MOVER DYNAMO PLANTS
Albert E. Lewis, Euclid, Ohio, assignor, by mesne assignments, to A. O. Smith Corporation, Milwaukee, Wis., a corporation of New York
Filed July 17, 1963, Ser. No. 295,624
7 Claims. (Cl. 290—40)

This invention relates to an electrically responsive control and particularly to a governor regulator for generators driven by a prime mover such as an internal-combustion engine, electical motors and the like wherein the regulator is responsive to the electrical load and/or frequency for controlling the prime mover.

Engine driven generators are generally provided with suitable governors for controlling the energization of the engine in accordance with the load and/or output frequency of the generators to prevent damaging or improper energization of the load and to prevent damaging of the equipment. For example, United States Patent 3,030,931 to D. J. Baxter et al., which issued April 24, 1962 for "Speed and Electrical Force Responsive Hydraulic Governor Units" discloses an engine-driven alternator system having a hydraulic system for controlling the fuel supply to the engine. Interposed between the output of the alternator and the load is a frequency and/or load change sensing circuit having an output interconnected with a portion of the hydraulic governor unit to control the supply of the fuel to the engine in accordance with any change in the amplitude and/or frequency of the output of the alternator. The present invention is particularly directed to an improved sensing circuitry and control for such applications as well as other similar type applications.

The present invention in its preferred construction includes a frequency sensitive circuit and a load sensitive circuit energized by the output of the alternator and interconnected to separately and cumulatively actuate a magnetically responsive switching circuit which is connected to actuate silicon controlled rectifiers of an exciter having an electroresponsive actuator coupled to the input power to the prime mover. The complete system employs magnetic and static control components having a long, reliable life and which are relatively insensitive to variations in temperature. The apparatus can therefore be used in installations subjected to wide temperature ranges without the necessity of temperature compensation means. The frequency sensitive circuit is a particularly important and novel feature which eliminates the need of a separate costly reference frequency supply employed in the conventional frequency comparison system. The load detection circuit employed is generally a static switching circuit employing a load sensing system which can immediately sense load changes and take the necessary corrective action. This is in contrast to the hydraulic governor systems which are responsive to changes in the speed of the diesel engine which occur some time after the actual change in the load. The immediate load responsive action is generally referred to as a load anticipation as the corrective action proceeds as the change in load is reflected in the diesel engine speed.

In summary, the present invention provides a relatively small compact control unit particularly adapted for precise power regulation in various applications and in particular in diesel engine driven alternators or the like.

More particularly, the improved frequency sensitive circuit of the present invention includes a pair of tuned circuits coupled to an output signal from the alternator output and to actuate the magnetic amplifier control unit. One tuned circuit is tuned slightly above the desired frequency and the second circuit is tuned to slightly below the desired frequency. Energization is such that the output of the two tuned circuits varies inversely and establishes balanced outputs with the frequency at the desired level. If the frequency output increases or decreases the output of the tuned circuits varies inversely, one increasing and the other decreasing, to effect a regulation through the control unit to reset the engine speed until the desired frequency output is again established. The two frequency detector circuits are substantially similar and have inverse actions. Consequently, disturbances in supply voltages and ambient temperatures are essentially minimized. Further, the circuit can be readily converted to different frequency ranges by switching of capacitors and the like with the particular frequency selected by adjustment of a rheostat or the like.

The load detector of the present invention includes a pair of balanced half wave rectifying circuits having output resistors connected in opposition and in series to provide a difference output for each output phase of the alternator. In one of the balanced circuits, means are provided for inserting a voltage proportional to the load, for example a very low resistance energized by a current transformer coupled to the load, and thereby inserting the signal in the total output of the rectifying circuits and the difference output. The difference output voltage will be proportional to the current times the cosine of the angle such that the load detector discriminates against reactive loads which are not felt by the prime mover such as the diesel engine. The output of the load detector is interconnected to the control unit through a separate control winding. The load detector circuit functions directly with load changes on the alternator and consequently will also serve to anticipate load changes and establish corrective action before the change in load directly effects the diesel engine speed.

The control unit as previously noted is a small magnetic amplifier employing a solid state gate switching system. The use of the magnetic amplifier allows isolated signal control windings and supplies output voltages compatible with input requirements of a power amplifier. In accordance with the present invention, silicon controlled rectifiers or other similar functioning solid state devices are interconnected in a pair of alternately active circuits each having a load reactor winding. The saturation of core means determines the voltage drop across a reactor winding relative to other elements including an output voltage unit. Generally, each of the half wave circuits includes resistance elements shorted by a diode. Thus, during one half cycle the diode will conduct and shunt or divert the current about the impedance element. During the opposite half cycle, the diode is reversely biased and will not conduct and the current must flow through the two impedance elements in series with the load and the reactor winding. The total available voltage is divided across the several impedances and the windings then effectively in the circuit. That is, the voltage drop will vary with the insertion and removal of the resistance as a result of the blocking action of the diode. The transition from the saturated to the unsaturated core state is extremely rapid establishing a switching action such that the period of current flow is closely regulated and as a result, the output power is closely regulated. During one half cycle, the one reactor winding is effective and similarly, during the other opposite half cycle, the opposite reactor winding is operative thereby providing a symmetrical full wave output for actuating a power amplifier.

The output of the control unit is interconnected to the power amplifier which is generally a full wave rectifier unit employing silicon controlled rectifiers in at least two of the legs thereof. The silicon controlled rectifiers are fired on alternate half cycles of the incoming frequency as determined by the voltage supplied from the controlled unit. Peaking transformers may be employed and excited by the magnetic amplifier of the control unit for controlled firing of the silicon controlled rectifiers.

The drawing furnished herewith illustrates the best mode presently contemplated for carrying out the invention and is described in detail hereinafter to set forth the several advantages heretofore discussed as well as other advantages described herein and which will be obvious to those skilled in the art.

The drawing is a schematic circuit diagram of an electrical control system applied to a diagrammatically shown diesel engine driven alternator for supplying three phase power to a load.

Referring to the drawing, an internal-combustion engine 1 is coupled to and drives an alternator 2 of which only the armature is shown. The engine may be a diesel, gasoline or other suitably fueled engine or may be any other suitable controllable prime mover which is adapted to drive the alternator 2 at the required speed under loaded conditions. The alternator 2 is illustrated as a three phase four wire alternator having four output lines consisting of the first, second and third phase lines 3, 4 and 5 and a neutral line 6. Any suitable load 7 is connected to the terminal ends of the lines 3–6, inclusive, and is furnished with power from the alternator 2 in accordance with proper driving by the engine 1. A frequency and load change sensing circuit 8 is connected to the output lines 3–6 of the alternator and particularly forms the subject matter of the present invention. The sensing circuit 8 is adapted to actuate an electromagnetic actuator 9 having a winding 10 energized by the output signal from the circuit 8. The winding 10 is electromagnetically coupled to actuate an actuating armature 11 to reposition the same in accordance with the change in the output of circuit 8. The armature 11 is coupled in any suitable manner, for example, as shown in U.S. Patent 3,030,931 to an engine throttle control 12 to vary the supply of fuel to the engine 1 and thereby vary the operation of the engine to maintain a predetermined frequency and load output characteristic.

The frequency and load change sensing circuit 8 of the present invention generally includes a load detector 13 responsive to changes in the current load and a frequency sensitive detector 14 responsive to any change in the output frequency of the alternator 2. Detectors 13 and 14 are interconnected through a magnetic amplifier control unit 15 to control the output of a power amplifier and exciter 16 which is connected to winding 10 of actuator 9.

Generally, the load detector 13 is coupled to the three phase lines 3–6, inclusive, to establish a signal proportional to the load current. If the load current varies from a predetermined norm, an output signal is fed to the control unit 15 which in turn varies the output of the power amplifier and exciter 16 to vary the fuel supply to engine 1 and readjust the speed of alternator 2 and the output accordingly. Similarly, the frequency sensitive detector 14 is connected to the lines 3–6, inclusive, to provide an output signal responsive to any variation in frequency from a predetermined operating condition. The output signal of detector 14 actuates control unit 15 and therefore the power amplifier and exciter 16 to readjust the operation of the engine if the frequency varies to either side of the selected frequency.

More particularly, the illustrated power amplifier and exciter 16 includes a phase to neutral control input transformer 17 having a primary 18 connected between the first phase line 3 and the neutral 6. A pair of separate secondaries 19 and 20 are electromagnetically coupled to the primary 18. The secondary 19 is employed for energizing of the exciter 16 whereas the secondary 20 is interconnected to provide power to the control unit 15.

Generally, the power amplifier and exciter of the present invention includes a single phase full wave bridge type rectifier 21 having a pair of input terminals 22 across which the secondary 19 is connected. The bridge legs immediately adjacent the one input terminal 22 include rectifying diodes 23 and 24, respectivley, which are oppositely biased to conduct with respect to the adjacent input terminal 22. The legs adjacent the opposite input terminal 22 are each formed respectively by series connected rectifying diode 25 and silicon controlled rectifier 26 and a rectifying diode 27 and silicon controlled rectifier 28. The rectifying diodes 25 and 27 are provided to protect the silicon controlled rectifiers 26 and 28 from damaging inverse voltages as a result of voltage surges in the A.C. supply established by transformer 17. Rectifier protection is also provided by a series connected resistor 29 and capacitor 33 connected directly across the secondary 19.

The power amplifier includes the output terminals 31 of the bridge rectifier 21 which are connected to the opposite ends of winding 10 of the electromagnetic actuator 9. In operation, the output of the power amplifier to the winding 10 is controlled and determined by controlling the firing or condution of the silicon controlled rectifiers 26 and 28 in the following manner.

Each of the silicon controlled rectifiers 26 and 28 are of a known and essentially the same construction and rectifier 26 is briefly described with corresponding elements in rectifier 28 similarly numbered with a superscript prime aded to distinguish between the two units.

The silicon controlled rectifier 26 includes an anode 32 and a cathode 33 connected in series with the rectifying diode 25. A gate 34 is connected to one side of a peaking transformer 35 the opposite side of which is connected to the cathode 33.

The silicon controlled rectifier 26 conducts only when the positive half cycle of the voltage source is impressed across it and even then is essentially non-conductive unless a proper trigger signal is applied to the gate 34. Thereafter, the rectifier 26 conducts during the positive half cycle independently of the signal at gate 34. Thus, by controlling the time the signal is applied to gate 34, the time during each positive half cycle that the rectifier 26 conducts is controlled and the total power to the winding 10 varied accordingly.

The peaking transformer 35 includes a secondary winding 36 connected between the cathode 33 and the gate 34 and a primary winding 37 connected to one output of the controlled unit 15 to produce a signal to silicon controlled rectifier 26 in synchronism with the application of the positive half cycle of voltage applied to rectifier 26. The opposite or corresponding primary 37' for the silicon controlled rectifier 28 is similarly connected to a second output of the control unit 15. The two silicon controlled rectifiers 26 and 28 are thereby fired to conduct on alternate half cycles of the incoming supply frequency. The particular time within each half cycle that the silicon controlled rectifiers fire is determined by energization of the peaking transformers 35 and 35' which are connected as the output load of the control unit 15.

The illustrated control unit 15 of the present invention includes a reactor having controlled output windings 38 and 38' interconnected in a pair of similar output circuits for energizing peaking transformers 35 and 35', respectively. The output windings 38 and 38' are carried on a common magnetic frame or core structure, diagrammatically shown, and carrying frequency proportional saturating windings 39 and 40 connected to the output of the frequency detector 14 and a load proportional saturating winding 41 connected to the load detector 13. A negative feedback winding 42 is also carried by the magnetic core and interconnected in a negative feedback circuit 43 from the output of the exciter 16 to stabilize the control circuit. The saturation of the magnetic frame interconnecting the control windings with the load windings 38 and 38' determines the reactance of the windings 38 and 38'. This in turn provides a controlled output from the control unit 15 as will be presently described.

The connection and output of the control unit is symmetrical in order to supply the necessary full wave output required by the silicon controlled rectifiers 26 and 28 of the power amplifier and exciter 16. Each of the two control circuits including the control windings 38 and 38' is substantially similar in construction, the only difference being that they are alternately actuated. Consequently, the circuit for firing or energizing winding 37 of peaking transformer 35 is hereinafter described in detail with corresponding elements in the opposite circuit similarly numbered with superscription primes added to distinguish between the several elements.

Transformer leads 44 and 45 connect the secondary 20 of the power amplifier input transformer 17 to the control unit for energizing both of the control circuits in parallel. The resistor 46 and a capacitor 47 are connected in parallel between the lead 44 and the controlled or load winding 38, the opposite end of which is connected to the one side of the primary 37 of peaking transformer 35. The opposite side of the peaking transformer primary 37 is connected to a parallel resistor 48 and diode 49 to the lead 45. The diode 49 is shown biased to conduct the current when the lead 45 is negative with respect to the apposite lead 44. The corresponding diode 49' for the controlled winding 38' is biased in an opposite direction. The output of the control unit is the voltage appearing at the terminals of the primary winding 37 of the peaking transformer 35. When the reactor core is unsaturated by the load energized control windings 39-41, the load winding 38 has a relatively high reactance and impedance with respect to resistor 48. As a result, the available voltage of the power supply or transformer 17 is substantially absorbed thereby and the primary voltage of the peaking transformer will be relatively small. However, when the reactor is saturated, the impedance of the controlled or load winding 38 is relatively extremely small and the voltage of the supply is transferred to the resistor 48 and the transformer primary winding 37' of the peaking transformer 35.

The reactor core is selected with saturation characteristic having a very sharply-defined knee or bend and as a result transition from the unsaturated to the saturated state is accomplished rapidly thereby effecting a switching action at any instance during the active half cycle of the associated controlled winding 38. The saturation of the core is determined by the total ampere-turns of the saturating windings 39, 40, 41 and 42 and the controlled winding 38. Generally, the load responsive saturating windings 39-42 are energized by direct current whereas winding 38 is energized by an alternating current. Windings 39-42 thus set a level about which the saturation varies cyclically with the current in winding 38. As a selected total ampere turns, the saturation characteristic moves rapidly from the unsaturated to the saturated state and transfers the voltage from across the reactor controlled winding 38 to the peaking transformer 35, as previously described.

Control is accomplished entirely during the active half cycle, between 0° and 180°, in accordance with the energization of winding 39-42. Thus, if the latter establish the saturated state, the rectifier 26 fires immediately or at 0° of the active half cycle. If windings 39-42 contribute sufficient ampere turns opposing saturation, the saturated state is never created and rectifier 26 does not fire. Thus, intermediate energization of windings 39-42 varies the point in the active half cycle at which the current in winding 38 switches the core to the saturated state and the rectifier 26 on.

During the negative or inactive half cycle, the current flows through the reactor winding 38 in series with both of the resistors 46 and 48; diode 49 being reversely biased and therefore no longer shunting the resistor 48. As a result, the current is limited through the reactor winding 38.

During the negative or inactive half cycle, rectifier 26 corresponds to the positive or active half cycle for silicon controlled rectifier 28 which is inserted or connected to the controlled winding 38' and the related components. The active circuit of winding 38' includes the resistors 46', diode 49' and the controlled winding 38' interconnected with primary winding 37' of the peaking transformer 35' for controlling firing of the silicon controlled rectifier 28 between 180° and 360° of the voltage source.

The control unit 15 employs a magnetic gate switching system operated at low power levels and providing for magnetic signal amplification and signal mixing through isolated control and controlled windings and power supplies and directly providing an output voltage matched to the input requirements of exciter 16. The saturating windings 39 and 41 of control unit 15 interconnect the frequency detector 14 and the load detector 13 to the power amplifier and exciter 16 and thereby control the actuator 9 in accordance with the frequency and load sensed signals to be presently described.

The frequency detector 14 includes a transformer 50 having a primary 51 connected in parallel with the primary 18 of transformer 17 between the phase line 3 and the neutral 6. Transformer 50 includes a center tapped secondary 52 having a center tap lead 53 and opposite end leads 54 and 55 referred to hereinafter as left end and right end leads for purposes of clarity or simplicity of explanation of the drawing. The center tapped secondary 52 thus provides a pair of oppositely phased voltages with respect to the center tap lead 53 which energizes the frequency proportional saturating windings 39 and 40 of the control unit. As the interconnecting circuits are substantially similar, the circuit for the winding 39 is hereinafter described in detail with corresponding elements in the circuit for winding 40 similarly numbered with superscript primes added for distinguishing the corresponding elements.

The circuit interconnected between transformer 50 and winding 39 includes a full wave bridge-type rectifier 56 having a pair of input terminals 57 connected to the tap 53 and the right lead 55. A pair of output terminals 58 are connected to the control or frequency proportional saturating winding 39.

A series resonant circuit is interconnected between the input to rectifier 56 and the transformer 50 and includes an inductor 59, diagrammatically shown as including a winding 60 carried on an iron core 61. A pair of capacitors 62 and 63 is connected in parallel with each other and in series with the inductor winding 60. A third capacitor 64 is provided in the resonant circuit for winding 40 in parallel with the capacitors 62' and 63'. A manual switch 65 is connected in series in the parallel circuit of capacitor 63 to allow selective insertion and removal of the capacitor from the circuit. Thus, when the switch is closed, the capacitor 63 is added to the circuit and thus increases the total value of capacitance connected in the circuit thereby converting from 60 to 50 cycle operation. The capacitor 63 provides a very simple and convenient means for converting the operating frequency range of the system.

The series resonant circuit is generally tuned to a predetermined frequency by proper selection of the inductor 59 and the capacitors 62 through 64, inclusive, in accordance with well known determination. The full wave rectifier 56 converts the A.C. input signal to a D.C. control signal which is taken from the output terminals 58 and impressed upon winding 39 as follows.

A filter capacitor 66 is connected across the output terminals 58 to provide a smooth D.C. signal. A gain control rheostat 67 having a movable tap 68 is connected in series with a current limiting resistor 69 between the rectifier 56 and the winding 39. The movable tap 68 is connected in accordance with known operation to adjust the proportion of the rheostat 67 inserted in the output circuit and thereby adjusting the gain of the frequency related signal. Further, in the circuit for energizing of the proportional saturating winding 39, a frequency adjusting rheostat 70 is connected in series with winding 39 and includes a movable tap or wiper 71 for adjusting the proportion or the length of the rheostat inserted in the circuit. Rheostat 39 controls the precise frequency setting over a small range.

The two resonant circuits formed by the inductor 59 and 59' and capacitors 62 and 63 and 62' and 63' and 64 are separately tuned with one of them tuned to a frequency slightly higher than the frequency being regulated while the other is tuned to a somewhat lower frequency than that being regulated. For discussion hereinafter, the resonant circuit for winding 39 is tuned to the higher frequency and that for winding 40 is tuned to the lower frequency. At the desired or regulated frequency, the outputs of the two tuned circuits are nearly equal. The output voltages of the tuned circuits are connected to the respective saturating windings 39 and 40 to establish opposing flux in the core of unit 15 and thus at the regulated frequency, the core is saturated to maintain the proper excitation of the actuator 9.

If the frequency of alternator 2 tends to increase, the current in the control winding 39 will increase while the current in the control winding 40 will decrease. Thus, the circuit for winding 39 is tuned to the higher frequency and the output increases with increased frequency. As a result there will be a difference ampere turn between windings 39 and 40 resulting in a proportionate saturation of the core of the reactor. The output to the power amplifier and exciter 16 thereby increases the excitation of the actuator 9. This in turn will move the throttle control 12 of the engine 1 to reduce the speed of the engine 1 and correct the frequency to the desired level. A decrease in the frequency of the alternator 2 establishes an opposite reaction with an opposite saturation of the reactor. The circuit is selected such that the control ampere turns in each of the control windings 39 and 40 is very large compared with the net ampere turns required to control the magnetic amplifier over its full range. Therefore, a small variation in the energization of windings 39 and 40 results in a substantial change in the core saturation and provides a very sensitive control.

The circuit is particularly stable as the two tuned circuits are substantially similar but of inverse action. As a result, the effect of any disturbances in supply voltage, the ambient temperature or the like is minimized.

In addition to maintaining the output at a selected frequency, the load detector 13 maintains a predetermined load current by a current proportional feedback signal, as follows. The illustrated load detector 13 is coupled to the generator output leads 3–5, inclusive, and establishes signals proportional to the output current in each lead for controlled energizing of the load proportional saturating winding 41 of the control unit 15.

Three current transformers 72, 73 and 74 are electromagnetically coupled to the respective three phase leads 3, 4 and 5 of alternator 2. The several transformers 72 through 74, inclusive, are inserted in three similar load signal circuits 75 through 77, inclusive, having serially connected outputs between a pair of output terminals 78 establishing a control signal which is fed to the saturating winding 41. The circuit 75 is hereinafter described in detail while corresponding elements of the signal circuits 76 and 77 are similarly numbered with superscript prime and double primes added respectively thereto to distinguish the numeral identification of the several corresponding elements.

The load signal circuit 75 is powered from the output of the transformer 50 of the frequency detector circuit 14 to provide phase to neutral voltage. Similarly, load signal circuits 76 and 77 are powered by similar transformers 50' and 50''.

More particularly the load circuit 75 includes an input or connecting lead 79 connected to the center tap 53 of the transformer secondary 52 and a pair of leads 80 and 81 connected respectively to the left lead 54 and the right lead 55 of the transformer 50. The load detector circuit 75 includes a pair of balancing half wave circuits each energized respectively by the signal between the tap lead 79 and the respective leads 80 and 81.

The half wave circuit between input lead 79 and input lead 80 includes a diode 82 serially connected in the input lead 80 and a resistor 83 connected between the diode 82 and the center tap lead 79. The other second half-wave circuit includes a current transformer winding 72 in series with a diode 84 and a resistor 85 connected between the diode 84 and the center tap lead 79 at a common junction 86 with resistor 83. A signal resistor 87 is connected in parallel with the current transformer winding 72. The resistance of resistor 87 is extremely small compared to the resistor 85 and in the absence of a signal in winding 72 does not essentially affect the current through resistor 85. In the absence of a signal in the current transformer winding 72, the voltage across resistors 83 and 85 is essentially equal and of opposite polarity. These resistors 83 and 85 are connected in series between the output terminals 78 and the voltages are added algebraically establishing a net zero output signal between the terminals 78 in the absence of a signal in winding 72.

The other two balanced circuits 76 and 77 respectively include the current transformer windings 73 and 74 similarly connected with the output resistors 83' and 85' and output resistors 83'' and 85''. The outputs of circuits 75, 76 and 77 are all connected in series between output terminals 78. As a result, in the absence of a signal in the current transformers, a zero output voltage appears between the output terminal 78. However, when the generator establishes a load current, the current transformer 72–74, inclusive, produce a proportionate voltage across each of the paralleled resistors 87, 87' and 87'' and unbalances the respective half-wave rectifying circuits 75, 76 and 77. A D.C. voltage output proportional to the load current times the cosine of the angle between the current and voltage appears between terminals 78. The circuit discriminates against reactive loads and varies the prime mover or diesel engine 1 in accordance with variations in resistive loading only, as follows.

A preset portion of the summed output voltage at terminals 78 is fed to the saturating winding 41 through a droop adjusting rheostat 88 which is connected directly across the output terminals 78. The rheostat 88 is connected in common at one side to the winding 41 and a terminal 78 and an adjusting tap or wiper 89 is connected to the opposite end of winding 41 to provide a proportionate energization of the winding 41. A voltage divider network 90 is interposed in the common connection to winding 41 and includes a pair of resistors 91 and 92 and a paralleled capacitor 93, shown as a part of the control unit 15. The saturating winding 41 is connected in series with an inductor or choke coil 94 and a current limiting resistor 95 between the junction 96 of resistors 91 and 92 and the rheostat wiper arm 89. The adjustment of the rheostat 88 determines the proportionate control voltage impressed upon control winding 41.

The voltage divider network 90 is provided to allow adjustment of the time constant of the control in accordance with the time constant of the particular engine being employed. Thus, addition of the capacitor 93 reduces the action or time rate of change of the current to the saturating winding 41 and thereby controls the time action.

If the load varies the proportionate output signal established by the load detector 13 correspondingly varies the energization of the saturating winding 41 to control the polarity switching of control windings 38 and 38' of the control unit 15 and the resulting energization of the power amplifier and exciter 16 to thereby reposition the actuator 9 and the attached fuel control 12. The droop control or adjusting rheostat 88 is provided to vary the frequency droop under load conditions. Thus, the ampere-turns of windings 39 and 40 in the frequency detector circuit remains essentially constant for any one fixed frequency. The load detector must therefore provide the necessary ampere turns to winding 41 to reposition the electrical actuator 9. The potentiometer or rheostat 88 provides a very convenient and inexpensive means for adjusting for a droop characteristic ranging from approximately several percent droop to a negative droop.

The illustrated load detector 13 functions directly with load changes on the alternator 2 and thus takes immediate corrective action. Hydraulic governors for operating diesel engines generally follow by a certain time interval any speed change because the load changes are not immediately reflected in diesel engine speed variations. This is due to the time constant characteristics of the diesel engines.

As previously noted, the present invention further provides a feedback saturating winding 42 within the control unit 15 for adjusting the overall gain of the regulator. The feedback circuit includes an adjustable resistor 97 connected in series with the winding 10 of the actuator 9. A tap or wiper arm 98 adjusts the proportion thereof connected in series in the circuit. The feedback winding 42 is connected across the resistor 97 in series with a current limiting resistor 99. The setting of arm 98 determines the voltage impressed upon winding 42 for any given output and thereby controls the negative gain of the regulator.

The operation of the illustrated embodiment of the invention is sumarized briefly as follows.

The load 7 is connected across the alternator 2 and the engine 1 is started to drive the alternator 2 at a selected speed. Normally, a predetermined load current and frequency output is established in accordance with the preadjustment of the various components of the circuit. For example, in the frequency detector circuit 14, if a 50 cycle current is desired, the switches 65 and 65' are closed to insert the capacitors 63 and 63' in the circuit and thereby readjusts the tuned circuit to a 50 cycle operation. If a 60 cycle operation is intended the switches 65 and 65' remain open. The droop adjustment potentiometer 88 is set to the desired change in the output curve of current versus frequency.

The frequency adjusting potentiometer 70 is set to finely adjust the frequency control within the range selected by the insertion or removal of capacitors 63.

The total gain of the regulator is predetermined by the settings of the gain adjustment potentiometers 67 and 67' of the frequency detector 14 and the feedback rheostat 97. Having made the above adjustments, the circuit properly responds to any variations in the output frequency and the load current. If the frequency varies, the outputs of the tuned circuits to the windings 39 and 40 varies inversely and establish a net ampere-turns to saturate the reactor of unit 15 to a predetermined degree below the knee of the saturation curve. The transition from the unsaturated to the saturated state as a result of current flow in windings 38 and 38' is thereby adjusted to provide switching action in the polarity of the voltage applied to the silicon controlled rectifiers 26 and 28. The energization of actuator 9 is determined by the timed firing of rectifiers 26 and 28 and therefore by the frequency detector 14 to reposition the input setting of engine 1 to compensate for the output frequency variation.

Variations in the output load current will unbalance the half wave balanced circuits 75, 76 and 77 of the load detector 13 and establish a proportionate output signal varying the energization of the saturating winding 41. This in turn will vary the switching action in the control unit 15 and the signal fed to the power amplifier and exciter 16 and energization of the actuator 9. The engine throttle control 12 is repositioned to properly vary the engine speed to compensate for the load variation and reestablish the desired load current.

Although the present invention has been particularly set forth in its various aspects in connection with the regulation of an alternator, the apparatus and the several improvements therein are of general application and particularly are applicable to other variable frequency alternator drive systems such as a direct current motor drive.

The present invention thus provides a small, compact and reliable unit of long life and excellent response operation. The double frequency detector of the present invention eliminates the more costly approach of employing a separate reference frequency supply. The magnetic amplifier allows small compact construction in combination with the silicon controlled type amplifier establishes excellent gain and response characteristics. The total system employs components which are relatively insensitive to temperature changes, eliminating completely such components as temperature-sensitive transistor preamplifiers which require some type of temperature compensation for reliable control functioning.

The present invention thus provides a practical regulator which may operate for long periods and over a wide temperature range.

Various modes of carrying out the invention are contemplated as being within the scope of the following claims particularly pointing out and distinctly claiming the subject matter which is regarded as the invention.

I claim:
1. A combined frequency and load regulator for an alternating current source,
   (a) an electroresponsive control for adjusting the frequency and current output of said source,
   (b) a control unit including a magnetic amplifier having control windings for actuating said electroresponsive control and a plurality of saturating winding means including a pair of frequency control windings and a load current control winding,
   (c) a frequency detecting circuit including a pair of tuned circuits connected to the output of the current source, one of said circuits being tuned to a frequency above the regulated frequency and connected to one of said frequency control windings and the second of said circuits being tuned to a frequency below the regulated frequency and connected to the second of said frequency control windings,
   (d) a load detecting circuit including a pair of additive rectifying circuits one of which includes a signal proportional to the load current and providing a load proportional output signal means, and
   (e) a frequency droop adjustment potentiometer circuit connecting said output signal means to said load current control winding and being presettable to determine the frequency characteristic between no-load and load conditions of the alterating current source.

2. A combined frequency and load regulator for an alternating current source,
   (a) an electroresponsive control for adjusting the frequency and current output of said source,
   (b) a control unit including a magnetic amplifier having control windings for actuating said electroresponsive control and a plurality of saturating winding means including a pair of frequency control windings and a load current control winding and a feedback control winding,
   (c) a frequency detecting circuit including a pair of tuned circuits connected to the output of the current source, one of said circuits being tuned to a frequency above the regulated frequency and connected to one of said frequency control windings and the second of said circuits being tuned to a frequency below the regulated frequency and connected to the second of said frequency control windings,
   (d) gain control means interposed in series between said tuned circuits and the corresponding control windings,
   (e) a load detecting circuit including a pair of additive rectifying circuits one of which includes a signal proportional to the load current and establishing a load proportional output signal means,
(f) a frequency droop adjustment potentiometer circuit connecting said output signal means to said load current control winding and being presettable to determine the frequency characteristic between no-load and load conditions of the alternating current source,
(g) a voltage dividing network including a capacitive means interconnected between said potentiometer circuit and the load current control winding to preset the load response time, and
(h) adjustable means connecting said feedback control winding for proportionate energization in accordance with energization of said electroresponsive means.

3. An electrical regulator for controlling the output of a current generator having an input, which comprises
(a) an exciter having a full wave rectifier with silicon controlled rectifiers in alternately active legs for controlling the magnitude of the output,
(b) a control unit having a magnetic amplifier including a pair of alternately active controlled windings and a pair of saturating windings, said controlled windings being connected one each in series with the input of the silicon controlled rectifiers,
(c) a frequency detector energized by the output of the generator and establishing an output proportional to the frequency of the output of the generator, said frequency detector being connected to a first of said saturating windings, and
(d) a load detector energized by the load current of the generator and establishing an output proportional to the load current of the generator, said load detector being connected to a second of said saturating windings.

4. An electronic voltage regulator for regulating the output of a multiple phase alternator driven by a prime mover having a speed control, said voltage regulator comprising,
(a) a power amplifier and exciter including a full wave bridge rectifier having diodes in each leg and silicon controlled rectifiers in two alternatively active legs and a power transformer connected to a phase output of the alternator and to the input of said bridge rectifier and having peaking transformers connected to control firing of the silicon controlled rectifiers to conduct, the output of the power amplifier and exciter being adapted to be connected to the speed control,
(b) a control unit having a magnetic amplifier with a pair of control windings and saturating windings, said control windings being connected in alternately active paralleled circuits each of which includes a pair of resistors and one of said peaking transformers and a diode connected in parallel with one of said resistors, said diodes being reversely connected to be alternately conductive, said magnetic amplifier being selected to rapidly change from an unsaturated to a saturated state,
(c) a load detector including individual means for sensing the load current in each phase and establishing an output proportional thereto, said individual means having three outputs connected in series,
(d) circuit means connecting the output of the load detector to one of said saturating windings and including adjustable means to preset the proportion of the output feed to the saturating winding, and
(e) a frequency detector comprising a pair of tuned circuits individually connected to energize a pair of said saturating windings, each of said tuned circuits being energized by the output of the generator, said tuned circuits being separately tuned whereby one is tuned to a frequency slightly above the regulated frequency and the other is tuned to a frequency slightly below the regulated frequency.

5. The regulator of claim 4 wherein the tuned circuits of said frequency detector include,
(a) an inductor,
(b) a plurality of paralleled capacitors connected in series with the inductor, and
(c) switch means to selectively adjust the number of capacitors in said plurality of capacitors.

6. An electronic voltage regulator for regulating the output of a three phase alternator driven by an internal-combustion engine having a throttle control, said voltage regulator comprising,
(a) a power amplifier and exciter including a full wave bridge rectifier having a silicon controlled rectifier in alternately active arms and a power transformer connected to a phase output of the alternator and to said rectifier and having peaking transformers connected to control firing of the silicon controlled rectifiers to conduct,
(b) an electroresponsive control connected to the bridge rectifier output,
(c) a control unit having a magnetic amplifier with a pair of control windings and at least three saturating windings, said control windings being connected in alternately active paralleled circuits each of which includes a pair of resistors and one of said peaking transformers and a diode connected in parallel with one of said resistors, said diodes being reversely connected to be alternately conductive, said magnetic amplifier being selected to rapidly change from an unsaturated to a saturated state,
(d) a load detector including a center tapped transformer for each phase and energized thereby and a pair of balance circuits for each phase connected to said transformer, said balance circuits each including a diode, an output resistor in series and being connected between the center tap and opposite ends of the transformer to establish opposing voltages in the output resistors, said output resistors being connected in a series output circuit, a current transformer coupled to the corresponding phase output of the generator, a signal resistor connected in parallel with the current transformer and in series in one of each pair of the balance circuits,
(e) circuit means connecting the output of the load detector to one of said saturating windings, said circuit means including a rheostat connected in parallel with a pair of resistors and with a response time control capacitor, said rheostat having a movable wiper arm, a resistor and an inductor connected in series with the saturating winding between the pair of resistors and the wiper arm, and
(f) a frequency detector comprising a pair of tuned circuits individually connected to energize a pair of said saturating windings, each of said tuned circuits being energized by the output of the generator and comprising an inductor in series wtih a plurality of paralleled capacitors and a full wave rectifier for establishing a direct current signal, the output of the one tuned circuit being connected in series with a gain rheostat and one of the saturating windings and the output of the other tuned circuit being connected in series with a gain control rheostat and a frequency adjusting rheostat and the other saturating winding, said tuned circuits being separately tuned, one to a frequency slightly above the regulated frequency and the other to a frequency slightly below the regulated frequency.

7. The regulator of claim 6 having,
(a) a variable resistor connected in series with the electroresponsive control, and
(b) a fourth saturating winding in said magnetic amplifier and connected in parallel with said variable resistor to provide an adjustable negative feedback to the magnetic amplifier.

References Cited by the Examiner

UNITED STATES PATENTS

| | | | |
|---|---|---|---|
| 2,558,729 | 7/1951 | Buechler | 290—40 |
| 2,682,633 | 6/1954 | Woerdemann | 290—40 X |
| 2,866,150 | 12/1958 | Lewis | 290—40 X |
| 2,909,779 | 10/1959 | Emery et al. | 290—40 X |
| 2,913,588 | 11/1959 | Liebel | 290—40 |
| 3,110,817 | 11/1963 | Frederick | 290—40 |
| 3,171,966 | 3/1965 | Bergslien | 290—40 |
| 3,176,142 | 3/1965 | Vandaveer | 290—40 |
| 3,176,209 | 3/1965 | Cappello | 318—332 |
| 3,181,050 | 4/1965 | Berman | 318—331 |

ORIS L. RADER, *Primary Examiner.*

MILTON O. HIRSHFIELD, *Examiner.*

G. SIMMONS, *Assistant Examiner.*

UNITED STATES PATENT OFFICE
CERTIFICATE OF CORRECTION

Patent No. 3,287,565                                                    November 22, 1966

Albert E. Lewis

It is hereby certified that error appears in the above numbered patent requiring correction and that the said Letters Patent should read as corrected below.

Column 12, line 62, after "gain" insert -- control --.

Signed and sealed this 7th day of November 1967.

(SEAL)
Attest:

Edward M. Fletcher, Jr.                                  EDWARD J. BRENNER
Attesting Officer                                              Commissioner of Patents